United States Patent [19]

Pradere et al.

[11] Patent Number: 4,618,783
[45] Date of Patent: Oct. 21, 1986

[54] PRODUCTION OF SHORT LIGHT PULSES BY TIME COMPRESSION

[75] Inventors: François Pradere, Soisy Sous Montmorency; Robert Frey, Paris, both of France

[73] Assignee: Centre National de la Rechereche Scientifique, Paris, France

[21] Appl. No.: 602,675

[22] Filed: Apr. 23, 1984

[30] Foreign Application Priority Data

Oct. 6, 1983 [FR] France ................. 83 15913

[51] Int. Cl.⁴ ............................... H03F 7/00
[52] U.S. Cl. ........................ 307/426; 372/3; 372/21; 372/22; 372/97; 330/4.5
[58] Field of Search ............ 372/3, 5, 21, 25, 22, 372/97, 98; 307/426, 425; 330/4.5

[56] References Cited

U.S. PATENT DOCUMENTS 4,348,599  9/1982  Pradere et al. ................. 307/426

*Primary Examiner*—Leon Scott, Jr.
*Attorney, Agent, or Firm*—Larson and Taylor

[57] ABSTRACT

Mono-pulses of light are generated by time compression of laser energy. A Raman medium is located in a low Q energy storage cavity having low losses for light at a predetermined frequency and energy delivered by a laser is that frequency in the storage cavity. The Raman medium is also located in a Stokes cavity dimensioned for having a high gain at a Stokes frequency. Most of the stored energy at the Stokes frequency is extracted by a single to and fro travel through the Stokes cavity.

15 Claims, 8 Drawing Figures

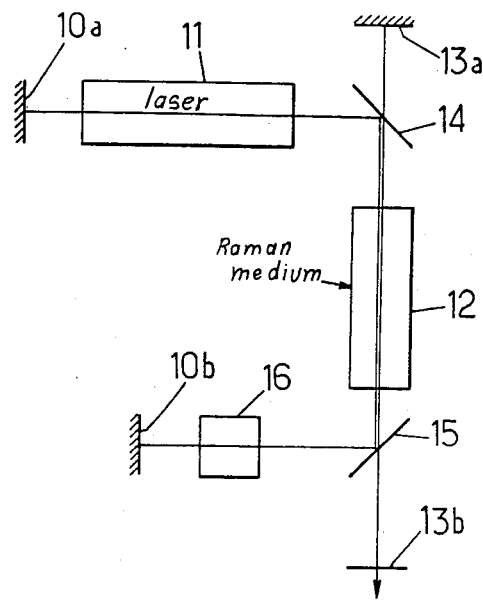
FIG.1.
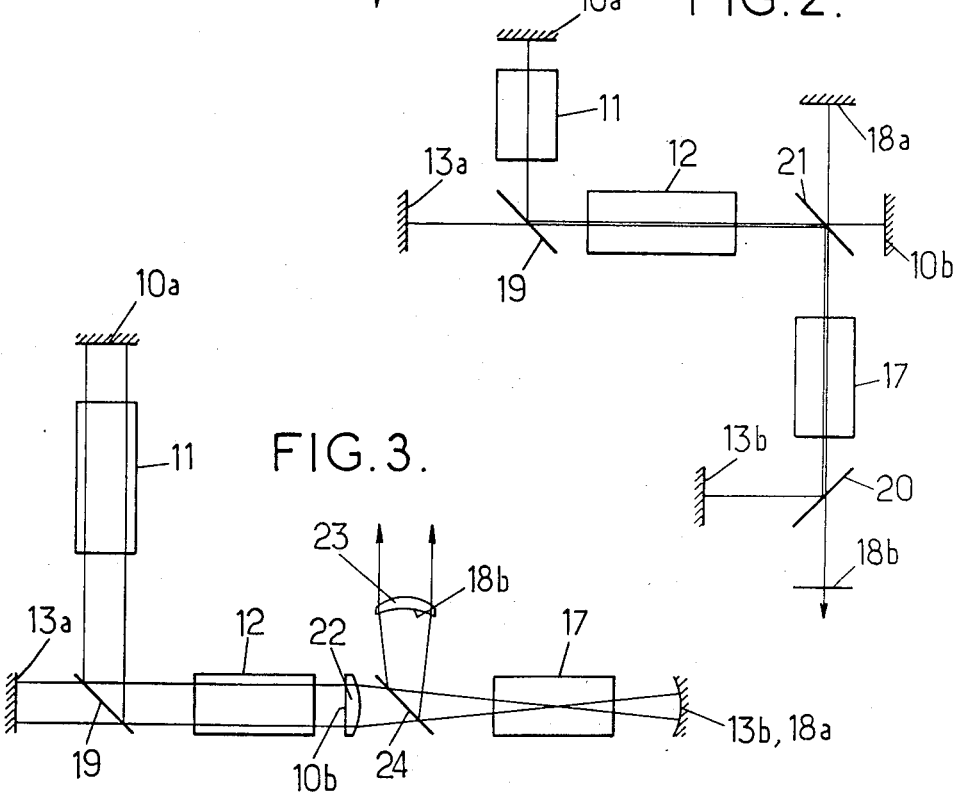
FIG.2.
FIG.3.

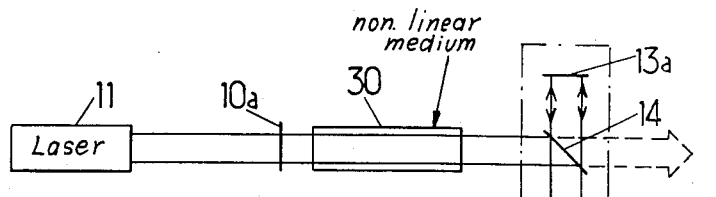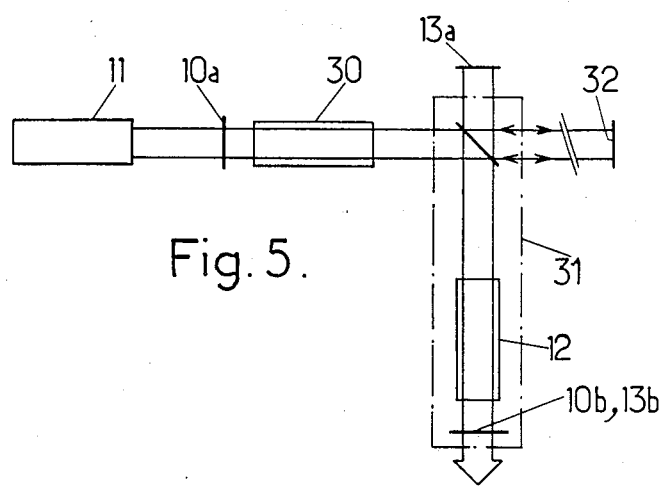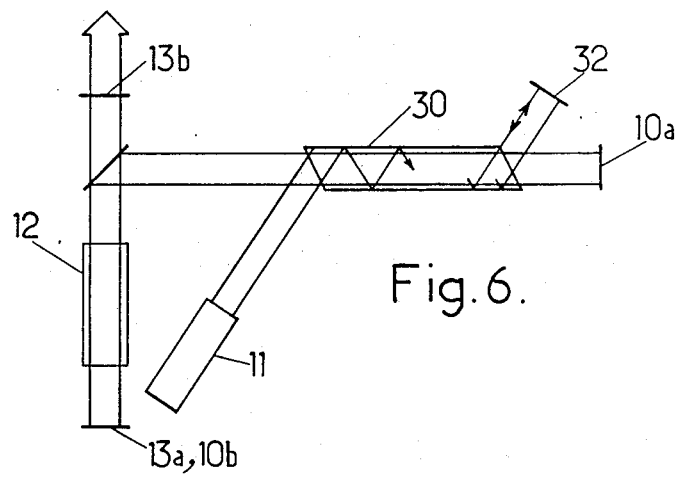

PRODUCTION OF SHORT LIGHT PULSES BY TIME COMPRESSION

BACKGROUND AND SUMMARY OF THE INVENTION

The invention relates to the production of short pulses by compression of laser pulses of relatively long duration. It more particularly relates to the production of mono-pulses of light (that term being construed as indicating IR and UV light as well as visible light) having a short duration. It has numerous applications, particularly in all fields requiring generators or amplifiers of brief and intense light pulses.

Methods have been used to obtain brief laser pulses with a good energy conversion efficiency. Most are based on the same principle, namely use of a lasing medium having considerable gain and a laser resonant cavity having a low Q. The rising time duration of the laser pulse is directly related with the time necessary to saturate the gain and the decay time reflects the life duration of the photons in the resonant cavity. Beside locked-mode lasers, which emit pulse trains whose unit duration is in the picosecond range of magnitude, the restrictions imposed by the pumping time, the reaching of gain saturation and the life duration in the cavity have the result that very few lasers exist capable of emitting single pulses whose duration does not exceed ten nanoseconds. It is obviously possible to shorten by cutting up the duration of the pulses supplied by the laser. Cutting up by electro-optical elements (Pockels cell, Kerr cell) permits the obtaining of pulses of some nanoseconds but causes a considerable energy loss since it does not provide compression. It has also been proposed to use Raman back-scattering to obtain time compression but corresponding devices are bulky and, taking into account the characteristics of the lasers used, the results obtained are generally limited (U.S. Pat. No. 4,306,195 to Stappaerts).

Stimulated Raman emission has also been suggested for achieving substantial average output powers at kHz pulse repetition frequencies with pulse lengths which may be in the nanosecond range. In stimulated Raman emission or scattering, a "pump" beam at a frequency $\nu p$ passing through a Raman medium results in a gain at a Stokes frequency $\nu s$ which is proportional to the pump beam intensity. Frequency $\nu s$ is selected for $\nu p - \nu s$ to be equal to the frequency of a Raman transition.

As long as the number ns of photons generated at frequency $\nu s$ is low as compared with the number np in the pump beam, the depopulation of the pump beam is negligible and the value of the Stokes pulse is an exponential funcction of the result of the product (pump intensity Ip)×(interaction length). Then the efficiency of the transformation process, as represented by ns/np (ns being the number of photons generated at frequency $\nu s$) is low. That approach is described in a paper entitled "0.9 W Raman Oscillator" by E. O. Ammam et al in Journal of Applied Physics, Vol. 48, No. 5, May 1977, p. 1973. It appears from the upper curve in FIG. 2 that the greater part of the pump energy remains stored in the cavity, depopulation being about 15%, and the quantum efficiency ns/np is low.

It is an object of the invention to generate short light pulses by time compression of laser energy by at least one order of magnitude with a high degree of efficiency. It is a more particular object to provide a process and apparatus delivering light pulses whose time length does not exceed some ns from pulses whose duration is greater by at least one order of magnitude with a quantum efficiency higher than 85%.

For this purpose, a method for producing brief mono-pulses of light includes the steps of locating, in a laser cavity, a Raman medium associated with a cavity dimensioned so as to present a considerable gain at the Stokes frequency and extracting most stored laser energy at the Stokes frequency in a single to and fro travel through the cavity.

The time compression obtained enables the light intensity of the pulse to be notably increased.

The invention may be put into practice in an amplifying device as well as a light generator or again in a complete system comprising an oscillator and one or more amplifiers.

The invention also provides a device for producing mono-pulses of light of short duration, comprising a laser cavity; in the laser cavity, there is placed a Raman medium also inserted in a Stokes cavity having a low Q, capable of converting energy at the laser frequency into energy at the Stokes frequency. This permits in particular the production of novel infrared sources. The laser cavity has preferably the highest possible Q.

In the case of operation as an amplifier, it is possible to amplify a spectrally pure Stokes wave by equipping the device with spectral compression means of the type described in U.S. Pat. No. 4,348,599.

The means for extracting the pulse at the Stokes frequency can be constituted by a semi-transparent mirror at this frequency, constituting one of the walls defining the Stokes cavity, having a reflection factor not exceeding some percent for the Raman frequency in order that the Q may be low. The zone common to the laser and Stokes cavities can be bounded by separators which are transparent for the laser or Raman frequency, reflective for the other.

Several Raman cavities can be overlapped so as to obtain energy transfers in cascade: such an assembly enables successive frequency shifts towards the infrared to be achieved. In addition, it is possible to use frequency unable laser media placed in dispersive cavities or injected by an external source and hence to create tunable radiation pulses, always of shorter duration than the initial laser pulse. With a coupled-mode laser, adaptation of the cavity lengths makes it possible to achieve durations as short as a picosecond, all the energy being recovered in a single pulse. Finally, the invention can be used to improve the performances of low gain laser (Alexandrite for example) and those of short life-span lasers (excimer lasers for example).

The Raman medium may be placed in the laser cavity. However, that restriction —which is a drawback when the laser medium is absorbent at laser frequency, as is for example the case with excimer lasers— may be overcome if it is borne in mind that the process may be considered as having two phases, namely:

storing laser energy in the form of radiation, which storage is done by accumulation in the low loss laser cavity, whilst the gain of the laser is higher than the losses of the cavity;

extracting the laser energy at a frequency shifted by stimulated Raman scattering, that is to say by a non-linear optical process, which effects the frequency conversion with an amplification coefficient which increases exponentially with the stored energy.

In a modified embodiment of the invention, the second phase of the method (energy extraction from the cavity at the Stokes frequency in a time corresponding to a single to and fro travel through the cavity, in a high gain medium) remains unchanged. However, the first phase is modified: a non-linear medium capable of effecting a frequency change is located in the storage cavity and the beam of the laser (which is outside the storage cavity) is injected into the non-linear medium whereby there is an intermediate step.

The storage cavity will be bounded by means which give it a high Q at the storage frequency. A convenient solution consists of injecting the laser beam into the storage cavity through a dichroic mirror transparent at the laser frequency, but almost totally reflecting at the storage frequency.

The non-linear medium for conversion of the laser frequency, which constitutes a pump frequency, to the storage frequency, may utilize very various processes, for example:

stimulated scattering by the Raman effect, a parametric process, which reduces the frequency to a value equal to a passive complementary frequency, frequency doubling, which requires starting from a sufficient low pumping frequency so that media transparent at the storage frequency may be available, frequency tripling, which requires starting from a laser frequency in the infrared or visible range, for the same purpose as that described with regard to frequency doubling.

A modified device for producing mono-pulses of light of short duration, comprising high Q cavity for the storage of light energy provided by a laser, in which cavity is placed a Raman medium also inserted in a Stokes cavity with a low Q for converting energy at the storage frequency into energy at the Stokes frequency; the laser is placed outside the storage cavity and the latter contains a non-linear medium for receiving the laser beam, adapted to convert the laser energy into energy at a storage frequency for which the storage cavity has a high Q.

The invention will be better understood on reading the description which follows of preferred embodiments given by way of examples.

SHORT DESCRIPTION OF THE DRAWINGS

FIG. 1 is a block diagram of an oscillator device using a triggered laser and one Raman medium;

FIGS. 2 and 3, similar to FIG. 1, show devices with two Raman media, comprising a laser cavity and two overlapping Stokes cavities;

FIG. 4 is a block diagram of an oscillator device using a non-linear Raman diffusion medium to effect the conversion of laser frequency into storage frequency;

FIG. 5, similar to FIG. 4, further comprises a mirror totally reflecting at the pumping frequency, improving the efficiency of the process and reducing the divergence of the storage beam;

FIG. 6, again similar to FIG. 4, shows a device for transferring energy to the non-linear medium using multiple reflections of the laser beam;

FIGS. 7A and 7B show two further modifications.

DETAILED DESCRIPTION OF PREFERRED EMBODIMENTS

Figure 7A:
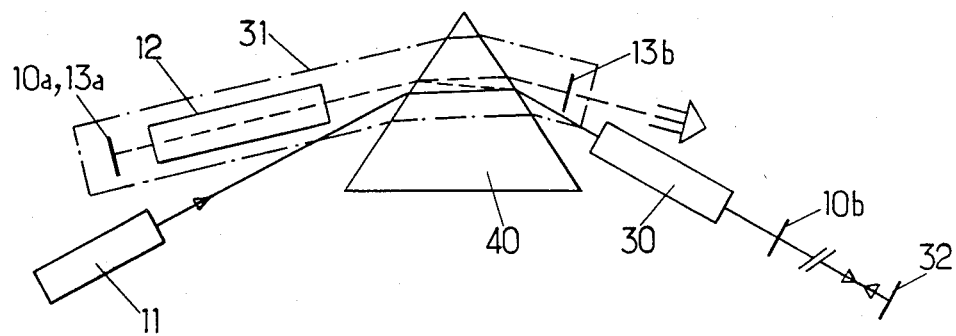
Figure 7B:
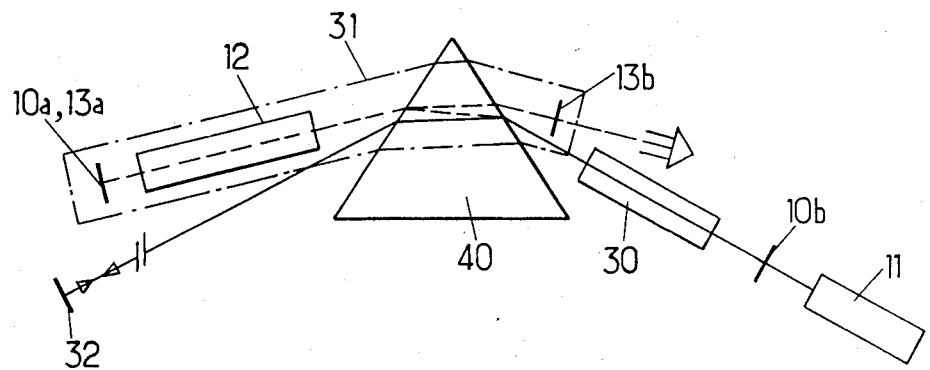

Referring to FIG. 1, an oscillator device comprises a laser cavity bounded by two mirrors $10a$ and $10b$ operating under a 90° angle of incidence, having a reflection coefficient practically equal to 1 for the frequency at which the laser medium 11 has a gain. In the cavity is placed a Raman medium 12 straddled by two mirrors $13a$ and $13b$ defining a Stokes cavity. Mirror $13a$ is totally reflecting at the Stokes frequency whilst mirror $13b$ is weakly reflecting, i.e. has a coefficient of reflection which is typically of some percent at this frequency.

The two cavities must be uncoupled: for this, the Raman medium is located between two separators, constituted by two oblique mirrors 14 and 15 (at 45° to the optical path as shown in FIG. 1). The mirrors totally reflect the laser frequency at the selected incidence whilst they transmit the light at the Stokes frequency with very low reflection. The laser cavity contains a trigger 16, at least when the laser is such that the excited states of the laser medium has a long life-duration. The laser cavity so constituted has very low losses at the laser frequency; it can be used in two ways:

in the case of a low gain laser medium, it permits the laser radiation to effect the to and fro travels necessary to saturate the gain of the laser medium, that is to say to extract the greater part of the energy stored in the excited states;

in the case of a laser medium for which the excited states have short life-durations, it permits the energy to be stored in the form of radiation.

On the contrary, the cavity at Stokes frequency formed by the mirrors has a low Q.

The operation of the device so constituted is as follows. The energy stored in the laser cavity, considerable since the cavity is a low loss one, induces in the Raman medium a gain which is adjusted to a value such that the gain in the Stokes cavity reaches a sufficient value to convert with good efficiency the energy at the laser frequency into energy at Stokes frequency. This adjustment can be carried out by regulating the pressure of the Raman medium (gaseous mixture of hydrogen and argon for example) or the length of the Raman medium. On triggering the laser 11, the laser cavity is emptied of its energy in a time equal to or less than the time that the light takes to effect a to and fro path between the mirrors $10a$ and $10b$. The Stokes cavity being slightly overenergized, the life-duration of the photons therein is short and the pulse duration created at the Stokes frequency will consequently be equal to the extraction time of the energy from the laser cavity.

In other words, it is seen that there has been induced, in the Raman medium 12, placed in the laser cavity, a gain giving rise to a Stokes beam capable of emptying the laser cavity of its energy by converting, in some nanoseconds and with high efficiency, the electromagnetic energy at the laser frequency into electromagnetic energy at the Stokes frequency.

By way of example, it may be indicated that from a ruby laser which, in normal triggered operation, provides a pulse of 30 to 40 ns, according to the experimental conditions, there is obtained at the output of the mirror $13b$, Stokes pulses of 3 to 6 ns with Stokes laser quantum conversion efficiencies of 70 to 87%. The diagram of an amplifier is directly derived from Figure 1 by eliminating the mirrors $13a$ and $13b$; the energy is then extracted, at the Stokes frequency, in a single pass.

FIG. 2 shows a modification using two overlapping Stokes cavities so as to effect two energy transfers in cascade. In this Figure, where the elements corresponding to those of FIG. 1 bear the same reference numeral:

the laser cavity is bounded by mirrors 10a and 10b, having a reflection coefficient at the laser frequency close to 100%, operating at normal incidence;

the first Stokes cavity is bounded by mirrors 13a and 13b;

the second Stokes cavity containing a Raman medium 17 placed in a zone common with the first cavity, is bounded by mirrors 18a and 18b, the second (which constitutes the output window) having a reflection coefficient of several percent and very low absorptions at the second Stokes frequency.

The device of FIG. 2 must obviously include also separators permitting the laser and Stokes cavities to be dimensioned independently of one another. In the embodiment shown in FIG. 2, these separators comprise a first mirror 19 having a reflection coefficient close to 100% at the laser frequency and a transmission coefficient exceeding 95% at the Stokes frequency of the first cavity. The mirror 20, intended to uncouple the two Stokes frequencies, has a reflection coefficient close to 100% at the first Stokes frequency and a transmission coefficient higher than 95% at the second Stokes frequency. The mirrors 19 and 20 can for example be constituted by multi-dielectlric treated mirrors. The third separator element 21 receives the light at the three frequencies which take part in the device: in the case illustrated, it must have a reflection coefficient close to 100% for the Stokes frequency in the first cavity and a transmission coefficient exceeding 95% for the laser frequency and the Stokes frequency of the second cavity.

The embodiment shown in FIG. 3 is differentiated from the preceding one essentially in that the second Stokes cavity is provided with a concentric optical system intended to increase the Raman gain therein. There is again to be found in this Figure the laser medium 11, the first Raman medium 12 and the second Raman medium 17. The laser cavity is bounded by the mirror 10a and the plane surface 10b, treated to have a reflection close to 100% at the laser frequency and a transmission exceeding 95% at the first Stokes frequency, of a plano-convex lens 22. The first Raman cavity is bounded by a plane mirror 13a and a concave mirror, denoted by the two references 13b and 18b since it bounds also the second Raman cavity. This concave mirror is treated so as to have a reflection coefficient close to 100% at the two Stokes frequencies. The laser medium is nonetheless traversed by parallel beams, the convergence caused by the mirror 13b being compensated by the plano-convex lens 22, whose convex surface is treated to avoid reflections at the first Stokes frequency.

Finally, the second Stokes cavity is bounded by the mirror 13b, 18a and the front surface 18b of a convergent meniscus lens 23. The concave inner surface 18b is treated so as to have a low reflectivity, typically about 4% at the second Stokes frequency. The outer convex surface of the meniscus lens is treated against reflections at the second Stokes frequency. The radius of curvature of the mirror 18a and of the concave surface 18b is selected as a function of their separation to constitute a concentric cavity. The uncoupling between the two Stokes cavities is ensured by a separator 24 constituted by a mirror having a coefficient of reflection close to 100% at the second Stokes frequency and a transmission coefficient exceeding 95% at the first Stokes frequency.

Any medium possessing a sufficient Raman effective cross-section may be used in these devices. Gases seem to be the most advantageous having regard to the stimulated Brillouin scattering problems. In the case of overlapping Stokes cavities, the Raman media can be of different nature.

Referring to FIG. 4, a device will now be described in which the laser is outside the Stokes cavity. For easier comparison, those components in FIG. 4 which have a counterpart in FIGS. 1-3 are designated by the same reference number.

The laser 11 (pulsed laser which can be provided with a conventional trigger enabling it to operate in good conditions) provides a beam at pump frequency p to a storage cavity through a dichroic mirror 10a very transparent for the pumping frequency $\nu p$ (transmission coefficient higher than 95%). This mirror 10a constitutes, with a second mirror 10b, a cavity for the storage of energy at frequency $\nu s$. For this, the mirrors 10a and 10b must both be very reflecting at the storage frequency $\nu s$. This storage frequency is fixed by a non-linear medium which receives the energy of the laser beam through the mirror 10a. This medium can particularly be the Raman medium permitting an energy transfer with good efficiency to be ensured.

In the storage cavity so constituted is placed a Raman medium 12 framed by two mirrors 13a and 13b bounding a Stokes cavity 31. In the embodiment illustrated, the mirror 13b is merged with the mirror 10b defining the storage cavity, which necessitates the mirror 13a being lightly reflecting for the extraction frequency $\nu e$ and the mirror 10b, 13b being little reflecting at the frequency $\nu e$ (reflection coefficient of several percent) in order that the Stokes cavity may be little overenergized.

The two cavities must be uncoupled. For this there is provided a separator constituted by an oblique mirror 14 situated at 45° to the optical path in FIG. 1. This mirror totally reflects the storage frequency at the selected incidence, but it transmits the light at Stokes frequency with a very slight reflection, so as to allow it to pass between the medium 12 and the mirror 13a.

The operation of the device so constituted is as follows. The energy stored in the cavity 10a, 10b at low loss induces in the Raman medium 12 a gain which is adjusted to a value such that the gain in the Stokes cavity reaches a sufficient value to convert with good efficiency the energy at storage frequency into energy at Stokes frequency. This adjustment can, as in the case of the prior patent already mentioned, be effected by regulation of the pressure or of the length of the Raman medium. When the storage energy is a maximum, the cavity 10a, 10b empties its energy in a time equal to or less than the time that the light takes to effect a to and fro path between the mirrors 10a and 10b. The Stokes cavity 31 being little overenergized, the life-duration of the photons is short and the duration of the pulse created at the Stokes frequency will be consequently equal to the extraction time of the energy from the storage cavity.

In other words, there is induced, in the Raman medium 12, a gain giving rise to a Stokes beam capable of emptying the storage cavity of its energy by converting, in several nanoseconds and with high efficiency, the electromagnetic energy at the storage frequency into electromagnetic energy at the Stokes frequency.

The Raman media are not the only ones which can be used as non-linear media 30. In particular, it is possible to use crystals ensuring frequency doubling. However, this use is only practically possible if the laser 11 emits in the visible range, since the frequency doubling leads, in the case of a laser with a short wave length, to a field of ultraviolet in which transparent media are lacking. On the other hand, frequency doubling can be used in the case where the laser emits in the green or beyond.

The same requirement exists if frequency tripling is used by mixing the fundamental frequency of the laser with a harmonic obtained by means of a crystal: in this case, it is necessary to start from a laser frequency in the infrared or the visible range.

In all cases, a high efficiency can only be obtained if the energy created at each moment at the storage frequency $\nu s$ is in the form of a divergent beam such that the life-duration of the storage is higher than or equal to the duration of the pulse of the outer laser to be compressed. For certain non-linear processes, such as frequency doubling and parametric processes, the condition of tuning the wave vectors connects the divergence of beam created with that of the pumping laser 11. On the other hand, in the case of stimulated diffusions, the energy can be created within a large solid angle. In all cases of high divergence, it is useful, and sometimes even necessary, to use an arrangement such that the divergence of the beam at the storage frequency is reduced. This result is for example reached in the device shown in FIG. 2, which is differentiated from the preceding one by the addition of a mirror 32 which is reflecting at the pumping frequency $\nu p$. Thus, the laser beam returns on itself, whilst the residual energy escapes, in the case of FIG. 1, as indicated in the dashed lines. The mirror 14 must, in this case, be transparent at the pumping frequency $\nu p$.

Operation in this case is as follows: on the forward passage in the medium 30, a portion only of the energy, generally only several percent, is converted to the storage frequency $\nu S$. And only the less divergent portion of this energy will still be present in the storage cavity when the pumping pulse comes back after being reflected on the mirror 32. It is hence this little divergent portion which alone will be amplified at this moment.

It is seen that thus the divergence of the beam at the storage frequency is reduced whilst maintaining a high efficiency for the process of changing pumping frequency into storage-frequency.

Other solutions may be adopted to increase the period of construction of the storage pulse.

For example, in the case illustrated in FIG. 3, the path of the laser beam in the non-linear medium for conversion to the storage frequency is elongated by the use of multiple reflections, according to an arrangement comparable with that described in U.S. Pat. No. 3,515,897.

It is also possible to substitute, for the flat mirrors illustrated in FIGS. 1 and 3, spherical mirrors so as to reduce the losses at the storage frequency and to increase the Raman gain as already envisaged in U.S. Pat. No. 3,515,897.

A modification in the devices presented in FIGS. 1 and 2 consists of using a dispersing system (prism or grating) to separate the paths of the beams at the different frequencies and hence to simplify notably the conditions imposed on the dichroic mirrors. Figures 4A and 4B are diagrams of two embodiments also usable.

In the case of FIG. 4A, the outer laser beam 11 is introduced into the storage cavity by using the dispersion ($dn/d\lambda$) of a prism 40 (n being the index). This cavity is bounded at its end by mirrors 10a and 10b which are highly reflecting at the storage frequency s.

The Stokes cavity 31 is bounded by the mirrors 13a and 13b. The mirror 13a must be highly reflecting and 13b little reflecting at the extraction frequency $\nu e$ as in the preceding cases. A mirror 32 may advantageously be used to complete the device with the same advantages as those described above.

The embodiment illustrated in FIG. 4B only differentiates from the preceding one by inversion of the arrangement of the laser 11.

In all cases, the prism could be replaced by another dispersing element, such as a grating.

In yet another modification enabling short light pulses to be obtained, there is no time compression, but the use of a pumping laser providing a train of pulses of unit duration of the order of a picosecond. The length of the cavity 10a, 10b is, in this case, adjusted so that a to and fro path corresponds to an interval between two pulses of the pumping laser. A stacking effect is then produced, the gain induced by one pulse serving to amplify the pulse created or amplified by the preceding one. At the end of the storage phase, a pulse of the same length as the unit pulses appears, fed by all the pulses of the pumping train and enclosed in the storage cavity 10a, 10b. By suitably placing the mirror 13a, it is then possible to extract the energy in a single picosecond pulse, which realizes a stacking of energy without lengthening the duration.

The invention is obviously capable of being used not only in a generating device, but again in an amplifying device or in a complete system constituted by an oscillator and by several amplifiers in cascade. Finally, time compression may be associated with spectral compression according to the process of U.S. Pat. No. 4,348,599.

We claim:

1. A method for generating mono-pulses of light by time compression of laser energy, comprising: providing a Raman medium in a low Q energy storage cavity having low losses for light at a predetermined frequency; storing energy delivered by a laser at said predetermined frequency in said storage cavity; locating said Raman medium in a Stokes cavity having a high gain at a Stokes frequency; and extracting the stored energy at said Stokes frequency, whereby most of the stored energy is extracted by a single to and fro travel through the Stokes cavity.

2. A method according to claim 1, wherein a non-linear medium selected to generate a frequency shift is located in said storage cavity and the laser energy is injected into said non linear medium from a laser located outside of said storage cavity.

3. A device for producing mono-pulses of light of short duration, comprising a laser cavity having an optical path and having a high Q, a Stokes cavity having an optical path and having a low Q, a laser in said laser cavity and a Raman medium located in said laser cavity, said Raman medium being also located in said Stokes cavity, said Raman medium being one which converts energy at a frequency of said laser into energy at a Stokes frequency.

4. A device according to claim 3, wherein said Stokes cavity is defined by two mirrors at 90° to the optical path of said Stokes cavity, one of said mirrors being substantially fully reflective at the Stokes frequency while the other of said mirrors has a reflection coefficient in the one per cent range of magnitude and low absorpotion losses at the Stokes frequency.

5. A device according to claim 4, wherein the light splitting means are mirrors having a reflection coefficient close to 100% at one of the Stokes and laser frequencies and a transmission coefficient close to 100% at the other frequency.

6. A device according to claim 4, further comprising at least a second Raman medium in a second Stokes cavity having a low Q, the two Stokes cavities having an overlapping zone for energy transfer from one Stokes frequency to another.

7. A device according to claim 3, wherein a zone common to the laser cavity and Stokes cavity is bounded by light splitting means which are transparent for one of the laser and Stokes frequencies and reflective for the other, whereby the light at laser frequency is directed to the laser and the Stokes and laser cavities are uncoupled.

8. A device for producing mono-pulses of light of short duration, comprising a laser for delivering light at a predetermined frequency; a non linear medium, said non linear medium being one which converts light at said predetermined frequency into light at a different storage frequency and located to receive light from said laser; a storage cavity accommodating said non linear medium and having a high Q at said storage frequency; a Raman medium located both in said storage cavity and in a Stokes cavity having a low Q, said Raman medium being one which converts the energy at the storage frequency into energy at a Stokes frequency.

9. A device according to claim 8, wherein a light beam from said laser is injected into the storage cavity through a dichroic mirror substantially transparent at the laser frequency and reflective at the storage frequency.

10. A device according to claim 8, wherein a light beam from said laser is injected into the storage cavity through light dispersive means.

11. A device according to claim 8, wherein the Raman medium is located in containing means constructed and arranged to subject a beam from said laser to multiple reflections to increase the travel length in said Raman medium.

12. A device according to claim 8, wherein said non-linear medium is one which effects stimulated Raman scattering.

13. A device according to claim 8, wherein said non linear medium is one which effects a parametric process.

14. A device according to claim 8, wherein said non linear medium is one which effects frequency doubling.

15. A device according to claim 8, wherein said non linear medium is one which effects frequency trebling.

* * * * *